June 23, 1959     M. AUWÄRTER     2,891,807
FLANGED COUPLING WITH MEANS TO PROTECT GASKET FROM HEAT
Filed May 11, 1953     2 Sheets-Sheet 1
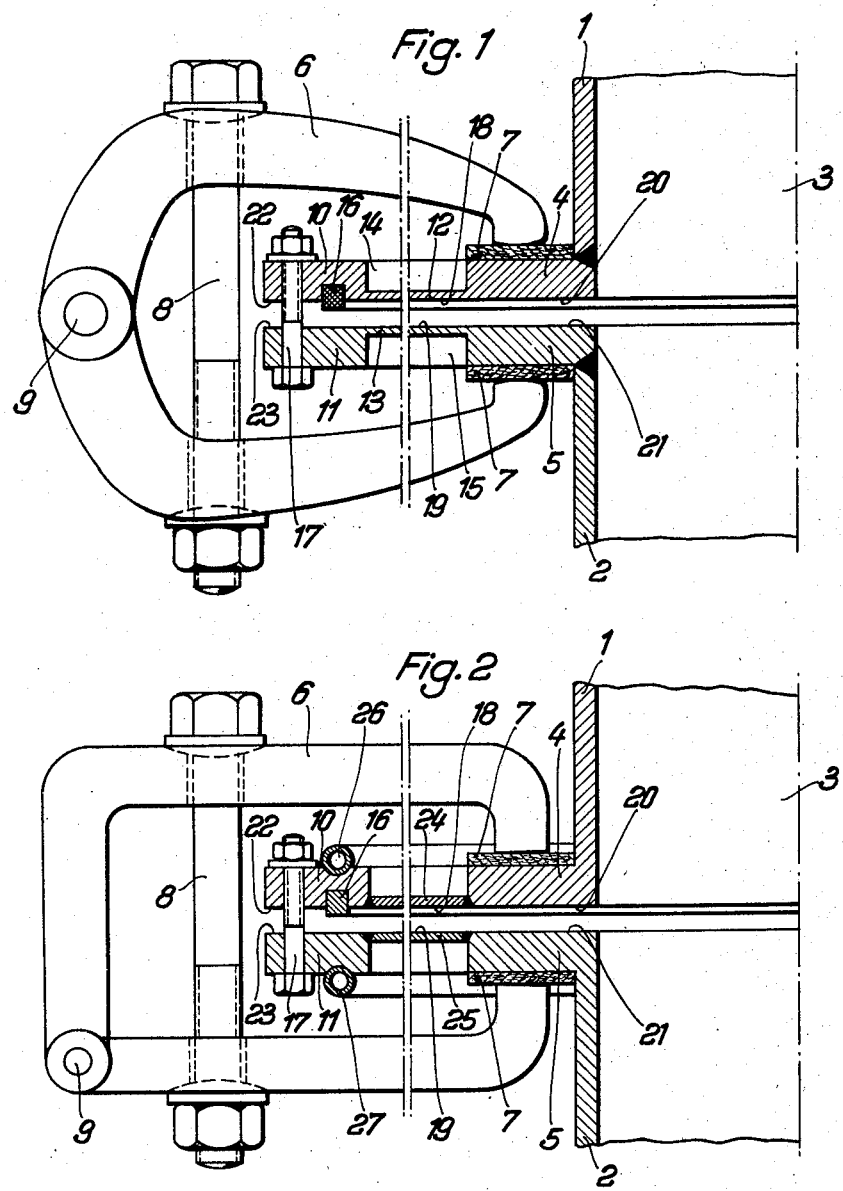
Inventor:
Max Auwärter June 23, 1959   M. AUWÄRTER   2,891,807
FLANGED COUPLING WITH MEANS TO PROTECT GASKET FROM HEAT
Filed May 11, 1953   2 Sheets-Sheet 2

Inventor:
Max Auwärter 2,891,807

FLANGED COUPLING WITH MEANS TO PROTECT GASKET FROM HEAT

Max Auwärter, Balzers, Liechtenstein, assignor to Geratebau-Anstalt, Balzers, Liechtenstein Application May 11, 1953, Serial No. 354,359

Claims priority, application Austria May 13, 1952

5 Claims. (Cl. 285—41)

The present invention relates to the preparation of mechanical connections equipped with temperature sensitive gaskets, but being nevertheless highly temperature-resisting, in particular for use with installations employed in thermic arts and operated under a vacuum, for example, in distillation or rectification apparatuses for carrying through single or fractional distillations under highly reduced pressure in closed devices. With these installations gaskets made, for example, of rubber, rubber compounds, artificial materials, like synthetic plastic materials, or other materials or compounds having at the same time yielding and adaptable properties must be used which on the one hand are highly temperature sensitive, while on the other hand the carrying out of the thermic process necessarily requires that the apparatuses and thus the gaskets consisting of these materials be exposed to high temperatures as well as to very low pressures or also to high superpressures. Since the problem arising under such contradictory conditions first of all appeared impossible of solution, one was hitherto compelled to avoid gaskets consisting of especially yielding and adaptable, but also temperature sensitive materials, and one was forced to employ material which did not fully comply with the packing purpose required. When temperature sensitive gaskets were employed one had to put up with the fact that such gasket had to be replaced after a comparatively short time, which caused interruption of operation and increased operation costs as an inevitable consequence.

The present invention starts from the conception that the mentioned technical problem can be solved in spite of the aforementioned contradictory requirements.

Mechanical connections of highly temperature resisting character and constructed in accordance with the invention and equipped with temperature sensitive gaskets, in particular such as are adapted for use with installations operating under vacuum as employed in the thermic arts, are characterized by elements of the connection forming packing and pressing surfaces and being arranged separately from each other between which poorly heat conducting materials are placed. In this manner one succeeds in throttling the flow of heat from the pressing to the packing elements or even practically to eliminate it, so that without further difficulties it becomes possible to use also the most temperature sensitive materials for forming the gaskets and nevertheless to be able to bring the stability of the mechanical connection to each value desired.

In general, such elements of the connection having pressing surfaces will be designed as flanges of such parts which form the connection or which are comprised by it. Furthermore, such elements of the connection having packing surfaces, thus preferably the gaskets themselves, will be arranged in flanges of such parts which form the connection or which are comprised by it. Thus there results the possibility of connecting both flanges, that is, pressing and packing flanges, by means of intermediate pieces which act as poor heat conductors and which are much thinner when compared with the thickness of the flanges. This can be accomplished in a most simple way by constructing the intermediate pieces as plate-like elements. Hereby two substantial possibilities arise. The plate-like intermediate pieces can first of all form together with the flanges a joint piece, thus a homogeneous workpiece. Consequently, this means that the plate-like intermediate webs which then can be considered as part of a complete flange, are to be produced by deformation, for example, by rolling out or by cutting, that is, by turning out or by milling the complete flange. The intermediate pieces also can form an inserted piece lying between the flanges. In this case they will consequently be designed as plate rings from the first, and will be welded to the pressing and packing flanges or fastened to them in any other manner. In both cases, there results the possibility of making the intermediate rings, for instance, of highly alloyed steel, because in this manner greatest stability can be combined with poorer conduction of heat. In each case, however, the bordering surfaces of the intermediate pieces facing each other should terminate flush with bordering surfaces of the pressing or packing flanges, respectively, with both of them being arranged opposite each other, since thereby the intermediate pieces in the fixed and tight position of the flanges are, because of their contiguity, relieved of the load being caused by all external forces. For the same reason the packing flange always will be designed of larger diameter than the pressing flange, whereby there arises the further advantage that fastening means for the packing flange which are to be provided, if necessary, are relieved of these forces. That means, that for fastening of the pressing flange hoops are to be provided which lap over the packing flange. If shims designed as poor heat conductors are arranged between these hoops and the pressing flanges, also a comparatively small flow of heat coming from the device forming or comprising the flanges will act upon the hoops, so that these are not subjected to any temperature stresses. In consequence of the possibility of being able to construct the gaskets in the packing flanges of smaller diameter than that upon which, if necessary, fastening means for the packing flanges are placed, these fastening means even can be designed as anchors interspersing the packing flanges without thereby decreasing the packing effect in any way.

The shaping of such connections as accomplished in accordance with the invention results in the further possibility that the packing flanges can be cooled. Thereby, the gaskets arranged commonly in the packing flanges can be kept any temperature guaranteeing longest service life of the gaskets, for example, at room temperature, if it should not be desired to fall below this temperature by cooling. Such cooling can be carried out in most simple manner by arranging at the packing flanges, but also at the gaskets themselves, pipes which are traversed by cooling agent and which can easily be mounted and dismantled. However, it is self-evident that the packing flanges themselves can be provided with spaces traversed by cooling agent. There is the further possibility of arranging the gaskets themselves adjacent to such hollow spaces and to pack the latter simultaneously with the cooled gaskets, so that keeping the gaskets at the desired state of temperature does not cause any difficulties. As cooling agents also such substances can be chosen which indirectly influence favorably the technical properties of the gaskets and their service life.

The drawing shows embodiments of the invention by way of example of flange connections adapted for a rectifying column operating under high vacuum. In the drawing:

Fig. 1 shows in schematical representation a simple manner of execution of such a flange connection designed in accordance with the invention, while Fig. 2 shows in the same manner of representation an embodiment of the invention which is adapted to comply with higher standards.

Figure 3:
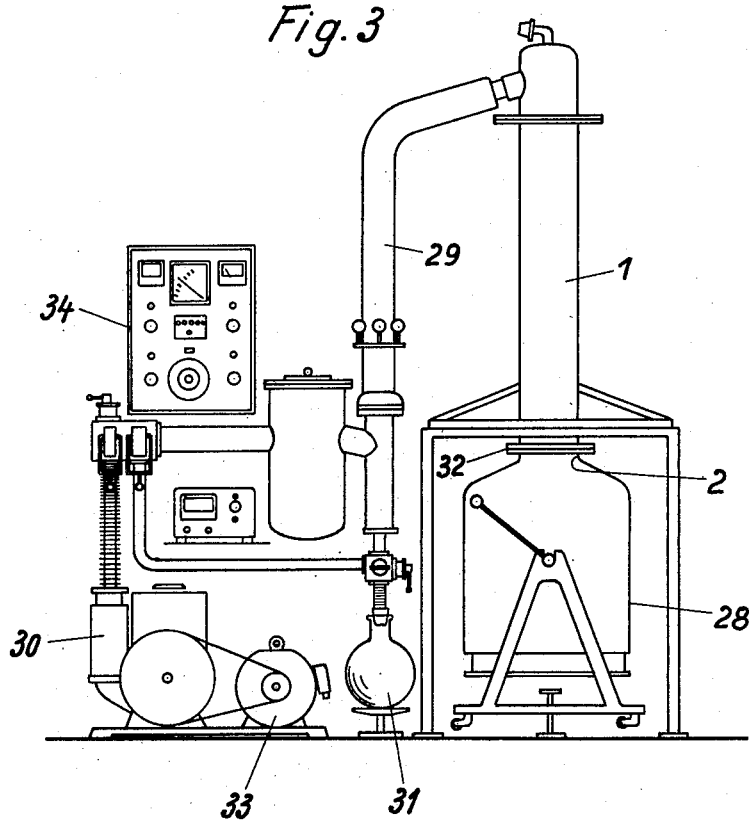
Fig. 3 shows the application of a highly temperature resisting mechanical connection as proposed according to the invention by way of example in a high-vacuum distillation plant.

In Figure 1 the two column parts which are to be fastened with each other by means of a flange connection designed according to the invention are designated with the numerals 1 and 2. It is assumed that a very low pressure exists in the chamber 3. At the same time there is a substance of high temperature, so that the connection between the parts 1 and 2 has to be designed to be highly temperature resistant. Nevertheless, the use of temperature sensitive vacuum gaskets should not be avoided. In order to solve the technical problems resulting therefrom, the following measures according to the invention have been taken:

The parts 1 and 2 have two annular flanges 4 and 5 which are so dimensioned that they are able to keep these parts in their position against all stresses arising and acting on same, if they are braced against each other with sufficiently high forces. Such forces can be made effective by means of hoops 6 which are brought to application at the pressing flanges 4 and 5 over annular pieces or segments 7, and that by means of strong screw bolt anchors 8 through which the hoop arms hinged at 9 are to be pulled together with any desired force. The annular pieces or segments 7, briefly called shims, are made of asbestos, fibre, compounds of both or the like, whereas metal intermediate pieces (not represented in the drawing) may provide for the uniform distribution of pressure. Besides the pressing flanges 4, 5, and spatially separated from these, there are provided special packing flanges 10, 11 which are in communication with the pressing flanges 4, 5 over intermediate pieces 12 and 13 which are constructed to act as poor heat conductors. The badly heat conducting properties of the intermediate pieces 12, 13 can be attained as well as by their form as by the kind of material they have been made of, as well as finally by both of these measured. In order to attain poor heat conducting properties by the shaping of the parts 12, 13, and in order to stop to a high degree or to interrupt the flow of heat from flange 4 to flange 10, or from flange 5 to flange 11, first of all a plate of ring-shaped design has been chosen for the parts 12, 13. As shown in Fig. 1, the parts 12 and 13 are very thin and may be produced by cutting grooves 14, 15 in an originally uniform and continuous flange 10, 12, 14, 4, or 11, 13, 15, 5, forming originally homogeneous annular pieces; however, also other methods of production, such as shaping, clearing, rolling out, etc., can be resorted to. Thus the parts 10, 12, and 4, or 11, 13, 5 form parts consisting of homogenous material. However, for the manufacture of the original complete flange certain materials, such as, for example, highly alloyed steels, will be employed, in order to provide poor heat conducting properties to the intermediate pieces 12 and 13 by reason of the material they consists of. Thereby, that the radial length of the intermediate pieces 12, 13 can be chosen as desired, it can be achieved without, and of course, especially in combination with, the decrease of heat conductivity depending on the choice of material, that the gaskets 16 located in the packing flange 10 are directly and indirectly withdrawn to a maximum extent from the influence of temperature of the chamber 3, so that thereby it has become possible to use for the manufacture of the gaskets 16 any material which independently of its temperature sensitivity guarantees in combination the desired packing effect with longest service life. As it is possible to assign a diameter to the gasket 16 smaller than upon which screw anchors 17 are to be arranged for securing the required packing forces, these screw anchors can be designed as screw bolts transversely interspersing the packing flanges 10, 11, so that producing the packing forces does not cause the slightest difficulties, as far as, regarding to the pressing forces, these packing forces are necessary at all, since the pressing forces only are capable of holding and maintaining the gaskets in their seat.

It can be recognized that after having clamped the joint in its final or closed condition (not represented in the drawing) the plate rings 12, 13 are fully relieved of all external forces, since they come to a close fitting contact with each other because their bordering surfaces 18, 19 arranged opposite to each other are flush with the oppositely to each other arranged bordering surfaces 20 and 21 of the pressing flanges 4 and 5, or 22 and 23 of the packing flanges 10 and 11.

In the example of execution according to Figure 2 the same numerals correspond to similar parts of the example as given according to Figure 1. The only difference is the construction of the annular pieces 24 and 25 which do not consist of a homogeneous work piece together with the flanges 4, 5 or 10, 11 but have been manufactured as insertion pieces separately from the flanges 4, 5, 10, 11, so that there is the possibility of making them of any desired material, especially one of poor heat conducting properties, and to weld the plate rings afterwards with the flanges 4 and 10, or 5 and 11 or to connect them with each other by any other suitable measure. A further and additional feature in the example is the arrangement of cooling conduits 26 and 27 which are arranged immediately close to the gaskets 16 in such manner that even a slight flow of heat through the plate rings 24 and 25 which eventually may occur, will not be able to cause any objectionable rise of temperature of the gasket 16. On the contrary, the cooling effect of the parts 26, 27 can be adjusted so that any desired temperature may be given to the gasket 16 independently of the temperature which may exist in the chamber 3. As by reason of the shape of the parts 24, 25 only small quantities of heat will be conducted, it is possible to maintain this condition of temperature even in case of low cooling effect during any period of time. By ribs attached to the intermediate pieces 12, 13, or 24, 25, or produced by turning, also the heat radiation surface can be brought to the desired value, so that an artificial cooling can be fully dispensed with.

Figure 3 shows the application of a highly temperature resisting mechanical connection designed in accordance with the invention which is arranged between the part 1, in the form of a distillation column, and the part 2 which has been constructed as a distilling flask at 28. The connection itself, designated with the numeral 32, has been constructed according to Figs. 1 or 2. The condenser of the distillation plant is designated with the numeral 29, while 30 designates the preliminary vacuum pump, 31 is the receiver, 33 is the operating motor, and 34 designates the supervisory, control, and regulation devices.

What is claimed is:

1. Mechanical heat-resisting connection comprising two tube-shaped metallic parts adapted to confine a fluid medium in a state varying from that of the atmosphere, opposed flanges extending radially from said parts and including relatively rigid annular metallic portions joined directly to said parts and having plane facing surfaces, clamping members bearing on said rigid flange portions and acting to press the flanges toward each other, and a temperature-sensitive gasket arranged between said flanges radially outwardly from said annular flange portions and acting to seal the medium against the atmosphere, said flanges including an intermediate poor heat-conducting section connecting the portions of the flanges bounding the temperature sensitive gasket and the relatively rigid flange portions, said section comprising flange parts the thickness of which is substantially reduced in comparison with the other parts of the flange, and said section acting to protect the temperature-sensitive gasket against excessive temperature rise.

2. Mechanical heat-resisting connection comprising two tube-shaped metallic parts adapted to confine a fluid medium in a state varying from that of the atmosphere, opposed flanges extending radially from said parts and including relatively rigid annular metallic portions joined directly to said parts, means for pressing the flanges toward each other, and a temperature-sensitive gasket arranged between said flanges radially outwardly from said annular flange portions and acting to seal the medium against the atmosphere, said flanges including an intermediate poor heat-conducting section connecting the portions of the flanges bounding the temperature-sensitive gasket and the relatively rigid flange portions, said section comprising a strip of sheet metal bonded to the radially inner and outer flange portions and acting to protect the temperature-sensitive gasket against excessive temperature rise.

3. Mechanical heat-resisting connection comprising two tube-shaped metallic parts adapted to confine a fluid medium in a state varying from that of the atmosphere, opposed flanges extending radially from said parts and including relatively rigid annular metallic portions joined directly to said parts, means for pressing the flanges toward each other, and a temperature-sensitive gasket arranged between said flanges radially outwardly from said annular flange portions and acting to seal the medium against the atmosphere, said flanges including an intermediate poor heat-conducting flange section connecting the portions of the flanges bounding the temperature-sensitive gasket and the relatively rigid flange portions, said section acting to protect the temperature-sensitive gasket against excessive temperature rise, the inner bordering surfaces of the intermediate flange sections being flush with the inner bordering surfaces of the attached radially inwardly and outwardly extending flange portions.

4. Mechanical heat-resisting connection comprising two tube-shaped metallic parts adapted to confine a fluid medium in a state varying from that of the atmosphere, opposed flanges extending radially from said parts and including relatively rigid annular metallic portions joined directly to said parts, clamping members having end portions bearing on said rigid flange portions and acting to press the flanges toward each other, and a temperature-sensitive gasket arranged between said flanges radially outwardly from said annular flange portions and acting to seal the medium against the atmosphere, said flanges including an intermediate poor heat-conducting flange section connecting the portions of the flanges bounding the temperature-sensitive gasket and the relatively rigid flange portions and acting to protect the temperature-sensitive gasket against excessive temperature rise, said clamping members overlapping the intermediate and outer flange portions.

5. A connection as defined in claim 4, including shims arranged between the clamp ends and the rigid flange portions, said shims being formed of poor heat-conducting material.

References Cited in the file of this patent

UNITED STATES PATENTS

| | | |
|---|---|---|
| 1,095,100 | Fulton | Apr. 28, 1914 |
| 1,621,950 | Perkins | Mar. 22, 1927 |
| 1,881,915 | Parker | Oct. 11, 1932 |
| 1,994,169 | Comins | Mar. 12, 1935 |
| 2,061,198 | Kohut | Nov. 17, 1936 |
| 2,103,981 | Hall | Dec. 28, 1937 |
| 2,271,425 | Harris | Jan. 27, 1942 |
| 2,282,354 | Gunn | May 12, 1942 |
| 2,344,424 | Singleton | Mar. 14, 1944 |
| 2,444,211 | Wager | June 29, 1948 |
| 2,451,941 | Glover | Oct. 19, 1948 |
| 2,520,501 | Guiler | Aug. 29, 1950 |
| 2,572,713 | Flynt | Oct. 23, 1951 |
| 2,628,852 | Voytech | Feb. 17, 1953 |

FOREIGN PATENTS

| | | |
|---|---|---|
| 737,761 | France | Oct. 1, 1932 |